July 7, 1953   M. J. BERLYN   2,644,436
VALVE ACTUATING MECHANISM
Filed Oct. 21, 1950
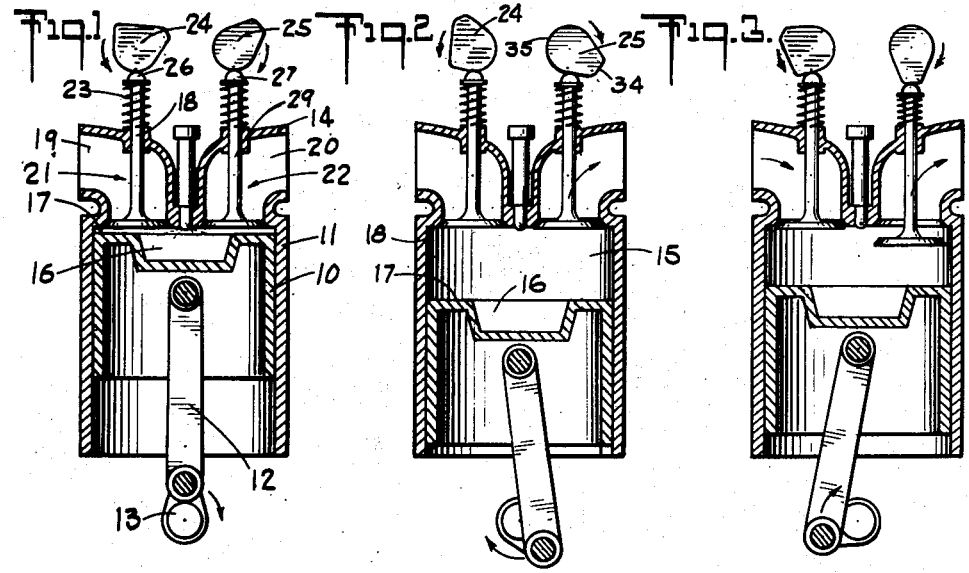
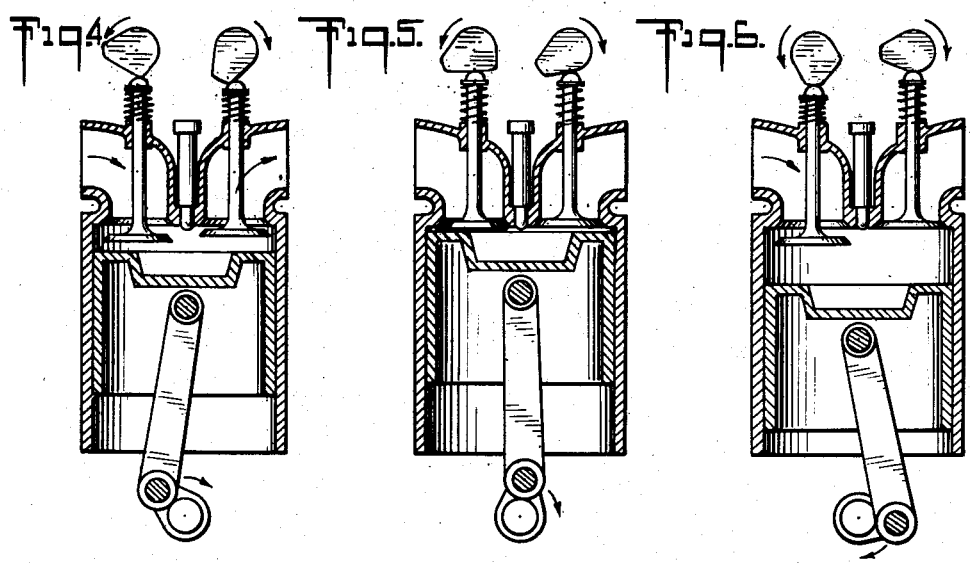
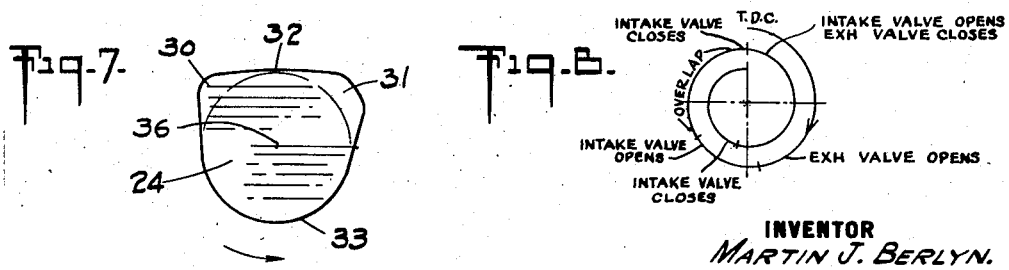
INVENTOR
MARTIN J. BERLYN.
BY
ATTORNEY Patented July 7, 1953

2,644,436

UNITED STATES PATENT OFFICE 2,644,436

VALVE ACTUATING MECHANISM

Martin J. Berlyn, Suffield, Conn., assignor to American Locomotive Company, New York, N. Y., a corporation of New York Application October 21, 1950, Serial No. 191,443

6 Claims. (Cl. 123—75)

This invention relates to internal combustion engines of the supercharged, four-stroke cycle, compression-ignition type; and more particularly to valve actuating mechanisms of the class wherein cams on the cam shaft actuate linkages to reciprocate the poppet valves controlling the intake and exhaust passages of the power cylinders.

In naturally aspirated compression-ignition engines of the four-stroke cycle, direct injection, open combustion chamber type, it is common practice to provide that the piston on its compression stroke will closely approach the base of the cylinder head in order to effect a "squish" or radially inward movement of the combustion-supporting air in the cylinder. Such "squish" promotes toroidal turbulence of the air charge during fuel injection, and such turbulence is conductive to good mixing of the fuel and air to accelerate flame propagation. In order to produce such "squish" action, it is conventional to design the crown of the piston with an annular rim which will just clear the cylinder head at the end of the compression stroke of the piston. Inwardly of the rim is a deep central cavity or depression, which constitutes the combustion space. To be most effective thermodynamically, the cavity should provide a high ratio of volume to surface. That is to say, the cavity should, as nearly as practical, approach the shape of a sphere. In practical application, the cavity is usually substantially cylindrical with a low diameter-depth ratio approaching unity.

In supercharged compression-ignition engines, however, where scavenging is provided, it is required that the opening of the intake valve and the closing of the exhaust valve have a considerable overlap. In the prior art, such overlap has been designed to take place during that part of the piston travel in which the piston is approaching and leaving top dead center on its exhaust stroke. In order to prevent the rising piston from colliding with the valves during overlap, some designers have resorted to relief recesses in the rim of the piston. Such recesses, however, have unsatisfactory characteristics. They diminish the effective area of the rim which coacts with the cylinder head to produce "squish," they cause surface discontinuities prejudicial to the development and maintenance of tangential swirl, they increase the piston area exposed to the heat of combustion, and, most important, they increase the total clearance volume so that the compression ratio is too small for the requirements of adequate cold starting and acceptable thermal efficiencies. This is particularly true in the cases of engines having four valves to a cylinder. Attempts have been made to overcome the unfavorable compression ratio by providing a shallower cavity, or even by eliminating the cavity. But such alternatives have been found wanting since the change in shape of the cavity constitutes a departure from the desired ratio of volume to surface.

To allow the use of a piston having a central cavity in its crown and a surrounding rim without recesses in a supercharged, compression-ignition engine of the type described is the principal object of this invention. More specifically, it is the object of the invention to provide, as part of the valve operating mechanism of an engine of the class described, cams so profiled that scavenging will be completed and both intake and exhaust valves substantially closed in time to clear the piston at the end of its exhaust stroke thereby eliminating the necessity of providing relief recesses in the piston crown. Stated otherwise, an object of the invention is to re-orient the scavenging overlap angle on the timing diagram of an engine of the class described so that it is substantially ahead of top dead center.

Other and further objects of the invention will appear from the following description, the accompanying drawings and the appended claims.

In the drawings, Figs. 1 to 6 inclusive are diagrammatic representations of successive positions of the piston, the intake and exhaust valves, and the actuating cams. In Fig. 1, the power stroke is just beginning; in Fig. 2 the power stroke is nearly complete just before the beginning of the exhaust stroke and the exhaust valve is shown as just beginning to open; in Fig. 3 the exhaust stroke is just beginning, the intake valve being slightly open and the exhaust valve fully open for the start of the scavenging operation; in Fig. 4 the exhaust stroke is nearing completion with both valves open; in Fig. 5 the exhaust stroke is shown slightly after completion, the valves having retracted to clear the piston at top dead center; and in Fig. 6 the intake stroke has begun. Fig. 7 is a profile view of the intake cam, and Fig. 8 is a timing diagram of the valve operations beginning with the power stroke and following the sequence of operations shown in Figs. 1 to 6 inclusive.

Referring now to the drawings in which the elements are diagrammatically represented, piston 10 reciprocates in cylinder 11 and is actuated by a connecting rod 12 operatively connected to crank shaft 13. Cylinder head 14 is secured to the cylinder to provide a combustion chamber 15. The crown of piston 10 is formed with a central cavity 16 and a rim 17, the length of the piston stroke being so designed that on the compression stroke, rim 17 closely approaches the flat base 18 of the cylinder head to effect a "squish" or radially inward movement of the combustion supporting air. It should be noted that rim 17 is continuous and uninterrupted by recesses, so that it will coact with the flat base 18 to achieve efficient "squish" action.

Central cavity 16 provides a major portion of the combustion chamber at ignition, and the "squished" air is received therein. It is substantially cylindrical and is dimensioned to provide a high ratio of volume to surface for most effective thermodynamic functioning. That is to say, the depth-diameter ratio of the cavity approaches unity. Cylinder head 14 is formed with intake and exhaust passages 19 and 20 in which are arranged intake and exhaust valves, generally indicated at 21 and 22 respectively. Return springs 23 control the valves in conventional manner.

The function of cams 24 and 25 is to dictate the opening and closing of the valves in desired timed relation. Cams 24 and 25 are shown as contacting followers 26 and 27 on the valve stems 28 and 29, although in actual construction such cams may be on the cam shaft and operatively connected to the valves by conventional push rods and rocker arms. Other types of operating connections between the cams and the valves are well known, but such connections form no part of the invention as such. Suffice it to say that the profiles of the cams are shaped to transmit desired motion to the valves by any of the conventional intermediate linkages or similar transmission mechanism, and that the cams are diagrammatically shown in the drawings without the intermediate transmission means. In the illustrative diagrams, the cams will be considered as rotating at one half the rate of rotation of the crank shaft, or at one rotation to each two rotations of the crank shaft in each four-stroke cycle. Such is the usual relation in engines of this class.

The periphery of cam 24 (see Fig. 7) is formed with a leading lobe 30 and a trailing lobe 31 with a flat or slightly convex connecting portion 32 therebetween. The minimum radial distance of connecting portion 32 from the cam center 36 is slightly greater than the radius of the base circle 33, as illustrated in Fig. 7. Cam 25 is formed with only one lobe 34 thereon, the remaining portion 35 of the periphery forming the base circle of the cam.

In operation, and in order to effect desired valve timing in accordance with the invention, the cams function as follows: At the start of the power stroke (see Fig. 1), cams 24 and 25 are operatively positioned so that their base circles 33 and 35 are registered with followers 26 and 27 respectively. That is to say, both valves are closed and the cams in this portion of the cycle will impart no opening movement to them. Throughout substantially all of the power stroke, both cams, rotating at one half the angular velocity of the crank shaft, will impart no motion to the valves since base circles 33 and 35 are arranged to continue registering with the followers during such interval. Shortly before bottom dead center of the crank rotation at the end of the power stroke, lobe 34 of cam 25 will initiate the opening movement of the exhaust valve 22. Such valve will reach its fully open position when the piston is substantially half way through its exhaust stroke and will return to fully closed position at, or shortly after, the completion of the exhaust stroke of the piston. Throughout the entire power stroke and for a few degrees of crank angle of the exhaust stroke, portion 33 of cam 24 will remain registered with follower 26 and the intake valve will accordingly remain in closed position. After the crank has travelled such few degrees in the first quadrant beyond bottom dead center of the power stroke, the leading lobe 30 of cam 24 will open the intake valve in order to allow for scavenging (see Fig. 4). This is the beginning of the overlap, since the exhaust valve is already open.

Lobe 30 and portion 32 are so dimensioned that the intake valve will move upwardly toward closed position in time to avoid collision with the rising piston. But the upward movement of the valve is limited so that closing contact with the seat is avoided at this point in the cycle and a second downward movement of the valve is effected again by lobe 31 on the intake stroke. This arrangement is provided in order to eliminate unnecessarily repetitive seating although Fig. 8 illustrates this with the legend "Intake Valve Closes." To produce such motion, portion 32, as previously described, is at all points of its surface disposed radially at a greater distance from the cam center 36 than the circumference of the base circle 33. During the intake stroke of the piston, trailing lobe 31 will open the intake valve and maintain it in open position, and during this period the base circle of cam 25 remains in register with follower 27 so that the exhaust valve remains closed. During the compression stroke of the piston, the base circles of both cams will register with their corresponding followers so that the valves will remain closed.

An inspection of the timing diagram (Fig. 8) illustrates the period of scavenging as determined by the mechanism of the invention. The overlap angle is disposed almost completely ahead of top dead center on the exhaust stroke of the piston and begins in the first quadrant following bottom dead center. In other words, the intake valve opens in the first quadrant following bottom dead center of the piston near the beginning of the exhaust stroke to permit scavenging through the exhaust valve which has already begun to open in the quadrant immediately preceding bottom dead center. The overlap continues throughout the quadrant immediately preceding top dead center of the exhaust stroke, after which the exhaust valve closes.

While there have been hereinbefore described approved embodiments of the invention, it will be understood that many and various changes and modifications in form, arrangement of parts and details of construction thereof may be made without departing from the spirit and scope of the present invention, and that all such changes and modifications as fall within the scope of the appended claims are contemplated as a part of this invention.

What I claim is:

1. In a supercharged compression-ignition engine of the four-stroke cycle class, in combination, a cylinder; a cylinder head having a flat base; a piston reciprocable in the cylinder; an annular uninterrupted rim on the piston crown adapted to coact with the flat base of the cylinder head to impart radially inward movement of combustion-supporting air on the compression stroke of the piston; an intake passage; an exhaust passage; a spring-return poppet intake valve; an exhaust valve; and means, including a cam, transmitting motion from the crank shaft to the intake valve to open the latter during the first half of the exhaust stroke of the piston to allow scavenging, said means thereafter during such stroke permitting the intake valve to move toward seating position in response to the urging of its spring in time to avoid collision with such piston.

2. In a supercharged compression-ignition engine of the four-stroke cycle class, in combination, a cylinder; a cylinder head having a flat base; a piston reciprocable in the cylinder; an annular, uninterrupted rim on the piston crown adapted to coact with the flat base of the cylinder head to impart radially inward movement of combustion-supporting air on the compression stroke of the piston; an intake passage; an exhaust passage; a spring-return poppet intake valve; an exhaust valve; and means transmitting motion from the crank shaft to the intake valve, including a cam having a lobe to impart opening movement to the intake valve during the first half of the exhaust stroke of the piston thereby to allow scavenging and to permit return of the valve toward seating position in response to the urging of its spring in time to avoid collision with such piston.

3. In a supercharged compression-ignition engine of the four-stroke cycle class, in combination, a crank shaft, a power cylinder, a cylinder head having a flat base, a piston reciprocable in the cylinder, an annular uninterrupted rim on the cylinder crown, a cavity in the piston crown radially inward of the rim, means connecting the piston to the crank shaft, the piston being adapted on its compression stroke to effect a radial inward movement of the combustion-supporting air into the cavity by the close approach of its rim to the base of the cylinder head; a spring-return intake valve; an exhaust valve; means to open the exhaust valve; and a cam actuated by the crank shaft having a lobe shaped to open the intake valve for scavenging purposes when the crank is in the quadrant immediately following bottom dead center at the beginning of the exhaust stroke, said cam permitting said intake valve thereafter to move toward closed position in response to spring urging at the completion of scavenging to avoid collision with the rising piston on its exhaust stroke.

4. In a supercharged compression-ignition engine of the four-stroke cycle class, in combination, a cylinder, a cylinder head having a flat base, a piston, an annular, uninterrupted rim on the crown of the piston, a cavity in the piston crown radially inward of the rim, the piston being adapted on its compression stroke to force combustion-supporting air radially inward into the cavity by the coaction of its rim with the cylinder head, an intake passage, an exhaust passage, a spring-return poppet intake valve, a spring-return poppet exhaust valve, means to transmit opening movement from the crank shaft to the inlet and exhaust valves, said means including a cam having a lobe shaped to open the exhaust valve before the beginning of the exhaust stroke of the piston but to permit its seating in response to spring urging slightly after the completion of such stroke, said means also including a second cam having a leading lobe shaped to open the inlet valve during the first half of the exhaust stroke of the piston to allow scavenging but to permit the return movement of the valve during the second half of the exhaust stroke in response to the urging of its spring in time to avoid collision with the piston.

5. A combination, according to claim 4, in which the second cam is provided with a trailing lobe adapted to open the inlet valve to permit the inflow of charging air into the cylinder upon the completion of scavenging.

6. In a supercharged compression-ignition four-stroke cycle engine of the class wherein the piston crown has an annular uninterrupted rim with a cavity radially inward thereof adapted to function as a portion of the combustion chamber, such rim coacting with the cylinder head to effect radially inward movement of the combustion-supporting air to achieve turbulence on the compression stroke, in combination, a spring return intake valve of the poppet type and means transmitting motion from the crank shaft to such valve, including a cam having a lobe shaped to open the valve during the first half of the exhaust stroke of the piston to allow scavenging but to permit the return movement of the valve during the second half of the exhaust stroke in response to the urging of the spring in time to avoid collision with the piston.

MARTIN J. BERLYN.

References Cited in the file of this patent

UNITED STATES PATENTS

| Number | Name | Date |
|---|---|---|
| 708,236 | Leonard | Sept. 2, 1902 |
| 1,146,864 | Gibson | July 20, 1915 |
| 1,781,039 | Treiber | Nov. 11, 1930 |
| 2,122,484 | Murray | July 5, 1938 |

FOREIGN PATENTS

| Number | Country | Date |
|---|---|---|
| 21,782 | Great Britain | Oct. 15, 1908 |
| 542,429 | Great Britain | Jan. 8, 1942 |
| 587,276 | Great Britain | June 14, 1945 |